(12) United States Patent
Park

(10) Patent No.: US 7,088,376 B2
(45) Date of Patent: Aug. 8, 2006

(54) DISPLAY APPARATUS CAPABLE OF INDICATING A PICTURE-IN-PICTURE FUNCTION IN MONITOR

(76) Inventor: Hyun-soo Park, 621-806 Dongbo Apt. 968 Youngtong-dong, Paldal-gu, Suwon-city, Kyungki-do (KR)

( * ) Notice: Subject to any disclaimer, the term of this patent is extended or adjusted under 35 U.S.C. 154(b) by 550 days.

(21) Appl. No.: 09/976,274

(22) Filed: Oct. 15, 2001

(65) Prior Publication Data

US 2003/0001968 A1 Jan. 2, 2003

(30) Foreign Application Priority Data

Jun. 30, 2001 (KR) ................................ 2001-38811

(51) Int. Cl.
*G09G 5/00* (2006.01)
(52) U.S. Cl. ..................... 345/629; 348/553; 348/565
(58) Field of Classification Search ................ 348/565, 348/553; 375/240.01; 345/629
See application file for complete search history.

(56) References Cited

U.S. PATENT DOCUMENTS

| | | | |
|---|---|---|---|
| 5,315,391 A * | 5/1994 | Lee | 348/553 |
| 5,467,144 A * | 11/1995 | Saeger et al. | 348/566 |
| 5,734,415 A * | 3/1998 | Hwang | 348/14.01 |
| 5,796,442 A * | 8/1998 | Gove et al. | 348/556 |
| 6,166,777 A * | 12/2000 | Ock | 348/565 |
| 6,252,906 B1 * | 6/2001 | Canfield | 375/240.21 |
| 6,333,731 B1 * | 12/2001 | Baek | 345/629 |
| 6,384,846 B1 * | 5/2002 | Hiroi | 345/794 |
| 6,414,723 B1 * | 7/2002 | Hwang et al. | 348/588 |
| 6,449,018 B1 * | 9/2002 | Yokoyama | 348/565 |
| 6,469,743 B1 * | 10/2002 | Cheney et al. | 348/553 |
| 6,493,038 B1 * | 12/2002 | Singh et al. | 348/565 |
| 6,510,553 B1 * | 1/2003 | Hazra | 725/87 |
| 6,519,283 B1 * | 2/2003 | Cheney et al. | 375/240.01 |
| 6,552,750 B1 * | 4/2003 | Suen et al. | 348/561 |
| 6,603,517 B1 * | 8/2003 | Shen et al. | 348/565 |
| 6,654,825 B1 * | 11/2003 | Clapp et al. | 710/60 |
| 6,661,422 B1 * | 12/2003 | Valmiki et al. | 345/530 |
| 6,806,911 B1 * | 10/2004 | Takemoto | 348/554 |

FOREIGN PATENT DOCUMENTS

KR 1998-015902 6/1998

* cited by examiner

*Primary Examiner*—Kee M. Tung
*Assistant Examiner*—Jin-Cheng Wang

(57) ABSTRACT

A display apparatus, and more particularly, a display apparatus capable of indicating a picture-in-picture (PIP) function on a color display tube (CDT) monitor, is provided. The display apparatus includes a signal dispensing unit for dispensing an output signal output from a personal computer (PC) in the form of an analog or digital signal and outputting the same, a signal processing unit for performing PIP signal processing enabling one of a digital PC signal generated by the signal dispensing unit and a decoded TV/video signal input from an outside source to be displayed on a main screen and the other to be displayed on one or more sub-screens, and for processing the TV/video signal to be displayed alone on the main screen, an outputting unit for outputting an analog PC signal generated from the signal dispensing unit in response to a control signal for displaying only the PC signal, and outputting an output signal of the signal processing unit in response to a control signal for displaying the PIP and TV/video signals, and a monitor for amplifying the signal output from the outputting unit to be displayed. According to the display apparatus, the PIP function can be realized, and also, a signal of high definition can be displayed on the CDT monitor.

20 Claims, 2 Drawing Sheets

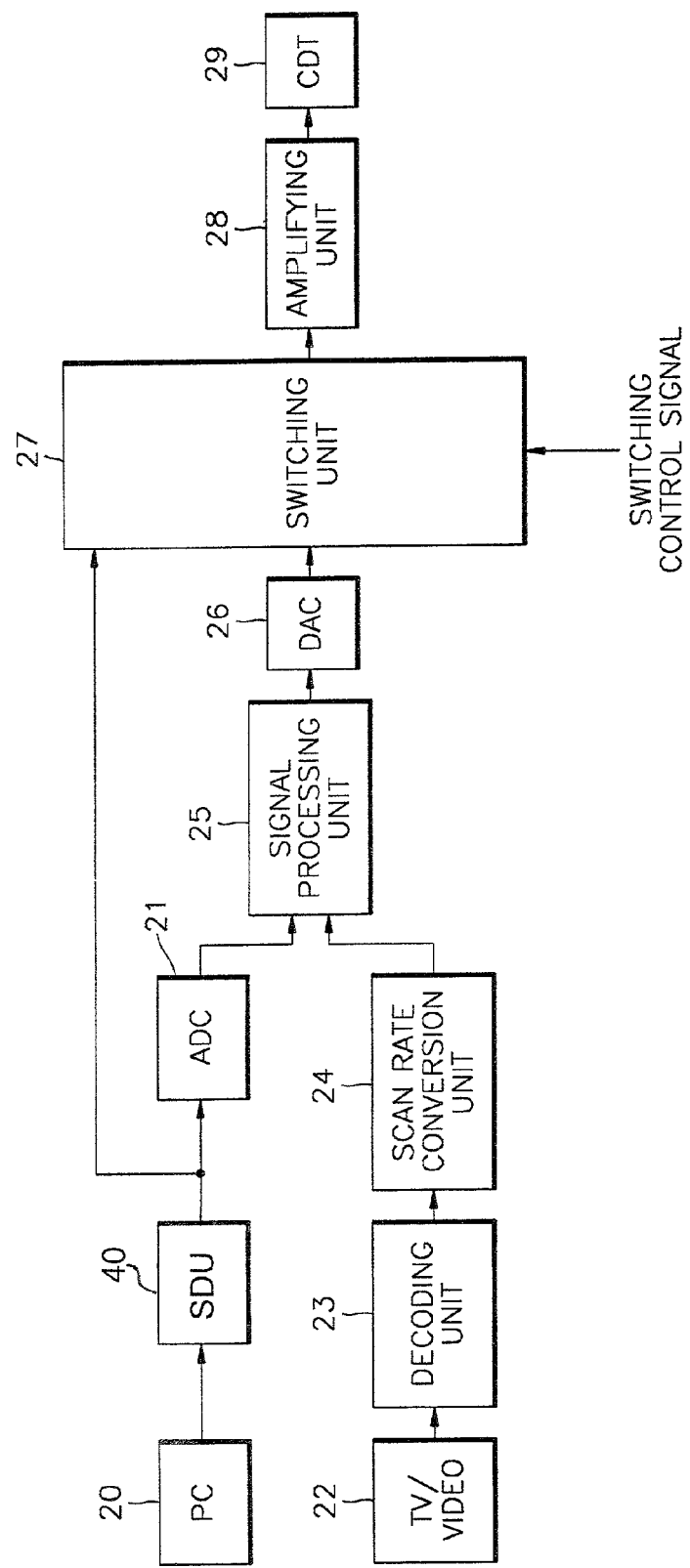

DISPLAY APPARATUS CAPABLE OF INDICATING A PICTURE-IN-PICTURE FUNCTION IN MONITOR

CLAIM OF PRIORITY

This application makes reference to, incorporates the same herein, and claims all benefits accruing under 35 U.S.C. §119 from an application for AN APPARATUS FOR PROCESSING SIGNAL OF MONITOR earlier filed in the Korean Industrial Property Office on Jun. 30, 2001 and there duly assigned Serial No. 2001-38811.

BACKGROUND OF THE INVENTION

1. Field of the Invention

The present invention relates to a display apparatus, and more particularly, to a display apparatus capable of indicating a picture-in-picture (PIP) function on a color display tube (CDT) monitor.

2. Description of the Related Art

With a jump to a higher level of information society, multimedia systems have rapidly come into wide use. Accordingly, the importance of display devices functioning as a bridge between human beings and electronic devices has increased.

Analog signals have been generally used when displaying a signal from a personal computer (PC) or television/video through a CDT monitor system. As shown in FIG. 1, a signal from a PC 10 is amplified by an amplification unit 11 and is displayed on a CDT 12 monitor such as a cathode-ray tube. On the other hand, digital data must be used when a signal from the PC or television/video is displayed through a liquid crystal display (LCD) monitor system.

In order to realize the PIP (picture-in-picture) function of indicating at least one sub-screen together with one main screen at the same time, as an optional function of a monitor, a signal from a PC or television/video must undergo a digital signal process. Therefore, the PIP function can be more easily realized in the LCD monitor than in the CDT monitor. To realize the PIP function in the CDT monitor, a scaler integrated circuit (IC) that is used in the LCD monitor is needed. However, when the scaler IC is used, a signal is displayed on the CDT screen after being converted into a digital signal, processed with a PIP process in the scaler IC, and then converted back into an analog signal. During these processes, screen image quality may be degraded.

SUMMARY OF THE INVENTION

It is therefore an object of the present invention to provide an apparatus for processing signals in a monitor so that an image of high definition is displayed without any degradation of image quality when the PIP function is realized in the CDT monitor.

It is another object to have an apparatus for processing signals in a monitor for the picture-in-picture function that is easy to manufacture.

It is another object to have an apparatus for processing signals in a monitor for the picture-in-picture function that is inexpensive to manufacture.

Accordingly, the above and other objects are achieved by an apparatus for processing a signal. It is preferable that the apparatus includes a signal dispensing unit for dispensing an output signal output from a personal computer in the form of an analog or digital signal and outputting the same, a signal processing unit for performing picture-in-picture signal processing enabling one of a digital personal computer signal generated by the signal dispensing unit and a decoded television or video signal input from an outside source to be displayed on a main screen and the other to be displayed on one or more sub-screens, and for processing the television or video signal to be displayed alone on the main screen, an outputting unit for outputting an analog personal computer signal generated from the signal dispensing unit in response to a control signal for displaying only the person computer signal, and outputting an output signal of the signal processing unit in response to a control signal for displaying the picture-in-picture and television or video signals, and a monitor for amplifying the signal output from the outputting unit to be displayed.

It is preferable that the apparatus further includes a signal conversion unit for converting the picture-in-picture signal output from the signal processing unit into an analog signal before a signal is output from the outputting unit. The signal processing unit includes a decoding unit for converting the television or video signal into a digital signal and decoding the same, a scan rate conversion unit for converting a scan rate of the decoded television or video signal, and a signal processing unit for performing a picture-in-picture signal process on the television or video signal whose scan rate is converted and the digital personal computer signal, so that one of the television or video and the digital personal computer signal is displayed on the main screen and the other of the television or video and the digital personal computer signal is displayed on the plurality of sub-screens, or for processing the television or video signal to be displayed alone on the main screen.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2 is a block diagram of an apparatus for processing signals in a monitor according to the present invention.

DETAILED DESCRIPTION OF THE INVENTION

Figure 1:
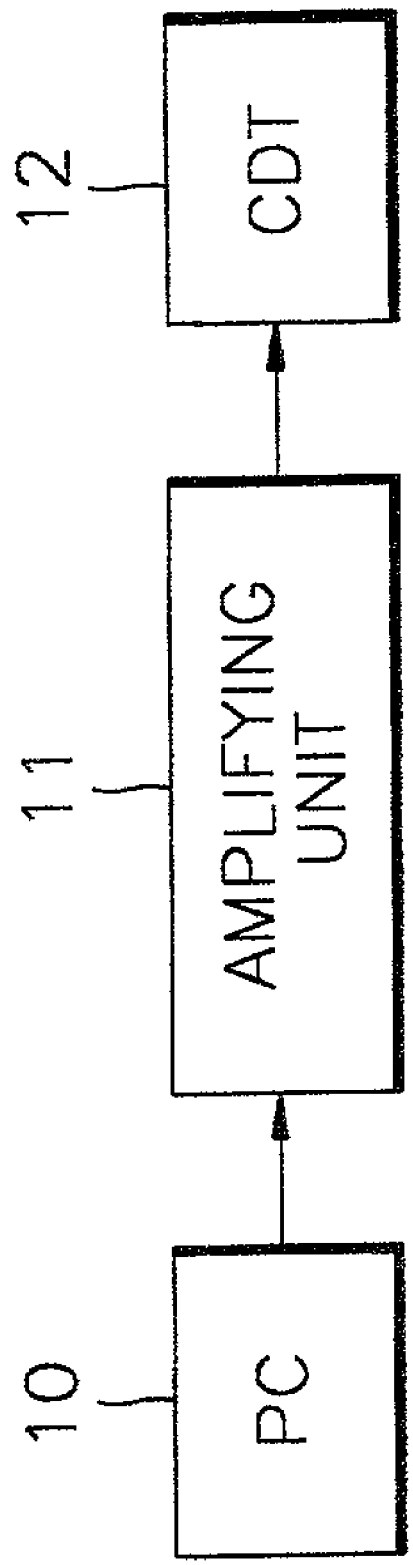
FIG. 1 is a block diagram of an apparatus for processing signals in an earlier color display tube (CDT) monitor.

Turning now to the drawings, referring to FIG. 2, the apparatus includes an ADC (analog to digital converter) 21 for converting an analog signal output from a personal computer 20 into a digital signal, a decoding unit 23 for converting a signal from a television or video 22 into a digital signal and decoding the same, a scan rate conversion unit 24 for changing a scan rate of the decoded signal from the television or video 22, a signal processing unit 25 for performing the picture-in-picture (PIP) function of displaying one of the personal computer (PC) 20 signal output from the ADC 21 and the television or video 22 signal output from the scan rate conversion unit 24 on the main screen and displaying the other on a plurality of sub-screens, or processing the television or video signal to be displayed, a DAC (digital to analog converter) 26 for converting an output signal generated from the signal processing unit 25 into an analog signal, an outputting (switching) unit 27 for outputting the analog signal output from the personal computer 20 when only the personal computer 20 signal is displayed and outputting a signal output from the DAC 26 when both the PC 20 signal and the television or video 22 signal are displayed using the picture-in-picture function, an amplifying unit 28 for amplifying a signal output from the outputting unit 27, and a color display tube 29 for displaying the amplified signal.

In FIG. 2, the apparatus for processing a signal in the monitor is operated largely in three modes including displaying a signal from the PC 20 (1st mode), displaying a signal from the television or video (TV/video) (2nd mode); and displaying two or more signals at the same time, i.e., picture-in-picture function (3rd mode). The television signal can be defined as broadcast video signals used to display an image that are for example transmitted through the air or through mediums such as conducting wire, fiber optics, or other mediums. The video signal can be defined as any possible signal that can be used to display an image and may include for example non-broadcast video signals such as from a video cassette recorder, digital versatile disc, video compact disc, and other media that can be used to generate a video image. The television or video signal cans for examples be originally in formats such as NTSC (National Television Standards Committee), SECAM (Sequential Color and Memory System), PAL (Phase Alternating Line), or other formats. The signal from the personal computer 20 can be for example in a VGA (Video Graphics Array) mode format or other modes with higher resolution (i.e., SVGA for super video graphics array, XGA for extended graphics array, etc.). The signals above have varying constraints such as frequencies and resolutions.

In the first mode, the color display tube 29 displays a signal from the personal computer 20 without modification. A signal from the personal computer 20 is selected by inputting an outputting (switching) control signal to the outputting unit 27. The selected signal from the personal computer 20 is amplified by the amplifying unit 28 and output to the color display tube 29. A signal dispensing unit 40 for dispensing a pure analog signal output from the personal computer 20 and a digital signal passing through the ADC 21 is included in the apparatus. In the first mode, the analog signal from the personal computer 20 is output from the signal dispensing unit 40.

In the second mode, a signal from the television or video unit 22 is converted into a digital signal and decoded in the decoding unit 23. For smoothly processing a signal, a scan rate of the decoded signal from the television or video is changed by the scan rate conversion unit 24. A horizontal frequency of the personal computer 20 is 30~85 kHz (17", 19" diagonal measurement of display screen) and that of the television or video 22 is 15.7 kHz (kilohertz) and thus, an error due to a large difference between the horizontal frequencies maybe made during signal processing. This problem can be solved by changing the scan rate of a signal generated from the television or video 22. A television or video 22 signal having a horizontal frequency of 15.7 kHz is changed to have a horizontal frequency of 31.4 kHz when passing through the scan rate conversion unit 24. The television or video 22 signal whose scan rate is changed is scaled in the signal processing unit 25 to be displayed on the CDT 29. The scaled television or video 22 signal passes through the DAC 26 and is then converted into an analog signal. A signal output from the DAC 26 is selected by inputting an outputting control signal to the outputting unit 27. The selected signal from the PC 20 is amplified in the amplifying unit 28 and output to the CDT 29.

In the third mode, at least two signals are displayed (PIP function) at the same time, i.e., the signals of the PC 20 and the TV/video 22 are displayed at the same time. According to one embodiment of the third mode, a digital signal output by the PC 20 is output from the signal dispensing unit 40 to the signal processing unit 25. The signal from the TV/video 22 passes through the decoding unit 23 and the scan rate conversion unit 24 and is output to the signal processing unit 25. In this mode, the signal processing unit 25 selects a main screen and sub-screens, processes a signal to correspond to a selected screen and processes a scaling for displaying the signal. As another embodiment, to realize the PIP function, a signal from the PC 20 and a signal from the TV/video are displayed, one on the main screen and the other on a sub-screen. A PIP signal generated from the signal processing unit 25 is converted into an analog signal in the DAC 26. In this mode, a signal output from the DAC 26 is selected by inputting an outputting control signal to the outputting unit 27. The selected signal from the PC 20 is amplified in the amplifying unit 28 and output to the CDT 29. The function of the outputting unit 27 is the same in the second and third modes, i.e., it is controlled to switch an output signal of the DAC 26. However, the function of the DAC 26 is not the same. That is, the DAC 26 outputs the scaled signal of the PC 20 to be displayed in the second mode, whereas it outputs signals from the PC 20 and the TV/video 22, which are PIP processed, to be displayed in the third mode.

According to the above-described apparatus, a pure signal from the PC 20, a signal from the TV/video 22 or a PIP signal that is the combined signals from the PC 20 and the TV/video 22, is displayed on the CDT 29.

While this invention has been particularly shown and described with reference to a preferred embodiment thereof, it will be understood by those skilled in the art that various changes in form and details may be made therein without departing from the spirit and scope of the invention as defined by the appended claims.

As described above, according to the present invention, the PIP function can be realized, and also, a signal of high definition can be displayed on the CDT monitor.

What is claimed is:

1. An apparatus for processing a signal, comprising:
    a signal dispensing unit dispensing a first personal computer signal output from a personal computer in the form of a first analog signal directly from said personal computer;
    an analog to digital converter converting the first analog signal from said signal dispensing unit of said personal computer to a first digital signal of said personal computer;
    a signal processing unit performing picture-in-picture signal processing enabling one of the first digital personal computer signal dispensed by said signal dispensing unit through said analog to digital converter and a decoded second signal as a second digital signal input from an outside source to be displayed on a main screen and the other to be displayed on at least one sub-screen, and said signal processing unit processing said second digital signal to be displayed alone on said main screen, said second digital signal being any one of a television signal and a video signal;
    a digital to analog converter converting a digital output signal of said signal processing unit into a second analog signal;
    an outputting unit directly connected to said digital to analog converter and directly connected to said signal dispensing unit of said personal computer, receiving said first analog signal from said signal dispensing unit and said second analog signal from said digital to analog converter converting said digital output signal from said signal processing unit, outputting the first analog signal dispensed from said signal dispensing unit in response to a control signal for displaying only the first personal computer signal, and outputting said second analog signal from said digital output signal of said signal processing unit in response to a control signal for displaying the first personal computer signal and said second signal in picture-in-picture format; and a monitor amplifying the signal output from said outputting unit to be displayed.

2. The apparatus of claim 1, further comprised of the first analog signal being outputted from said signal dispensing unit being included in said personal computer, with said personal computer sending the first analog signal to said analog to digital converter being directly connected to said signal dispensing unit of said personal computer, and said personal computer sending the first analog signal to said outputting unit being directly connected to said signal dispensing unit of said personal computer.

3. The apparatus of claim 1, with said signal processing unit, comprising:

a decoding unit converting said second signal into a digital signal and decoding said second signal;

a scan rate conversion unit converting a scan rate of said decoded second signal as the second digital signal; and a signal processing unit performing a picture-in-picture signal process on said second signal whose scan rate is converted and said first digital personal computer signal, accommodating one of said second digital signal and said first digital personal computer signal is displayed on said main screen and the other of said second digital signal and said first digital personal computer signal is displayed on the plurality of sub-screens, or for processing said second signal to be displayed alone on said main screen.

4. The apparatus of claim 1, with said decoded second signal input from an outside source, further comprising:

a decoding unit converting said second signal into a digital signal and decoding said second signal; and a scan rate conversion unit converting a scan rate of said decoded second signal.

5. The apparatus of claim 2, with said decoded second signal input from an outside source, further comprising:

a decoding unit converting said second signal into a digital signal and decoding said first signal; and a scan rate conversion unit converting a scan rate of said decoded second signal and outputting the second digital signal.

6. A method for processing a signal, comprising the steps of:

dispensing an output signal of a first analog signal directly from a personal computer;

sending the first analog signal to both a conversion unit and a switching unit, with the first analog signal being sent to said switching unit without conversion;

converting the first analog signal to a first digital signal through said conversion unit;

performing picture-in-picture signal processing enabling one of a first digital signal of said personal computer generated by the step of dispensing said output signal of said first analog signal and a decoded second signal input from an outside source to be displayed on a main screen and the other to be displayed on at least one sub-screen, and processing said second signal to be displayed alone on said main screen, said second signal being any one of a television signal and a video signal;

outputting from said switching unit, said first analog signal directly from said personal computer signal generated from the step of dispensing an output signal in response to a control signal for displaying only said first analog signal from said personal computer, and outputting an output signal of the step of performing picture-in-picture signal processing in response to a control signal for displaying said first analog signal of said personal computer and said second signal in picture-in-picture format;

amplifying the signal output from said switching unit; and displaying said amplified signal output.

7. The method of claim 6, further comprising the step of converting said picture-in-picture signal output from the step of performing picture-in-picture signal processing into a second analog signal from a digital output signal of said signal processing unit before the signal is output from the step of outputting from said switching unit.

8. The method of claim 6, with said decoded second signal input from an outside source, further comprising:

converting said second signal into a second digital signal and decoding said second signal; and converting a scan rate of said decoded second signal.

9. The method of claim 7, with said decoded second signal input from the outside source, further comprising:

converting said second signal into a second digital signal and decoding said second signal; and converting a scan rate of said decoded second signal.

10. An apparatus for processing a signal, comprising:

a personal computer generating an output signal accommodating a display of an image generated by said personal computer;

a signal dispensing unit dispensing said output signal from said personal computer directly to both an outputting unit and a converting unit;

a converting unit converting the output signal from an original first analog signal from said personal computer to a first digital signal of said personal computer;

a signal processing unit performing picture-in-picture signal processing enabling one of said output signal from said personal computer signal dispensed by said signal dispensing unit and a decoded video signal input from an outside source to be displayed on a main screen and the other to be displayed on at least one sub-screen, and said signal processing unit processing said video signal to be displayed alone on said main screen;

an outputting unit outputting the original first analog signal generated from and sent directly from said personal computer signal dispensed from said signal dispensing unit in response to a control signal for displaying only said personal computer signal, and outputting an output signal of said signal processing unit in response to a control signal for displaying said personal computer signal and said video signal in picture-in-picture format; and a monitor amplifying and displaying said signal output from said outputting unit.

11. The apparatus of claim 10, further comprising a signal conversion unit converting said picture-in-picture signal output from said signal processing unit from a digital signal into a second analog signal before a signal is output from said outputting unit.

12. The apparatus of claim 10, with said decoded video signal input from the outside source, further comprising:

a decoding unit converting said video signal into a digital signal and decoding said video signal; and a scan rate conversion unit converting a scan rate of said decoded video signal.

13. The apparatus of claim 12, with said decoded video signal input from the outside source, further comprising:

a decoding unit converting said video signal into a digital signal and decoding said video signal; and a scan rate conversion unit converting a scan rate of said decoded video signal.

14. The apparatus of claim 10, further comprised of said video signal being selected from the group consisting of a television video signal and a non-broadcasted video signal.

15. The apparatus of claim 10, further comprising:

a digital to analog converter unit converting said output signal generated from said signal processing unit from a digital signal into an analog signal for said outputting unit and not converting said original first analog signal from said personal computer to said outputting unit and displaying on said monitor said original first analog signal without converting said original first analog signal to a digital signal from said personal computer.

16. An apparatus for processing a signal, comprising:

a signal dispensing unit dispensing an original first analog signal output from a personal computer to a switching unit and to a first converter unit;

said first converter unit converting the first analog signal from said signal dispensing unit to a first digital signal;

a signal processing unit performing picture-in-picture signal processing enabling one of the first digital signal from said first converter and a decoded second signal as a second digital signal input from an outside source to be displayed on a main screen and the other to be displayed on at least one sub-screen, and said signal processing unit processing said second digital signal to be displayed alone on said main screen, said second digital signal being any one of a television signal and a video signal;

a second converter converting a digital output signal of said signal processing unit into a second analog signal;

said switching unit connected to said second converter and connected to said signal dispensing unit of said personal computer, receiving said first analog signal from said signal dispensing unit and said second analog signal from said second converter, said switching unit outputting the first analog signal dispensed from said signal dispensing unit in response to a control signal for displaying only the original first analog signal, and outputting said second analog signal from said second converter unit in response to a control signal for displaying the first analog signal and said second signal in picture-in-picture format; and a monitor amplifying a third analog signal output from said switching unit to be displayed.

17. The apparatus of claim 16, further comprised of said signal dispensing unit of said personal computer being directly connected to said switching unit.

18. The apparatus of claim 16, further comprised of:

said signal dispensing unit of said personal computer being directly connected to said switching unit; and said signal dispensing unit of said personal computer being directly connected to said first converter unit.

19. The apparatus of claim 18, further comprised of:

said signal processing unit being directly connected to said second converter unit; and said second converter unit being directly connected to said switching unit.

20. The apparatus of claim 18, further comprised of:

a decoding unit converting said second signal from the outside source into said second digital signal and decoding said second signal; and a scan rate conversion unit directly connected between said decoding unit and said signal processing unit and converting a scan rate of said decoded second digital signal output directly to said signal processing unit.

* * * * *

UNITED STATES PATENT AND TRADEMARK OFFICE
CERTIFICATE OF CORRECTION

PATENT NO.        : 7,088,376 B2
APPLICATION NO. : 09/976274
DATED             : August 8, 2006
INVENTOR(S)       : Park It is certified that error appears in the above-identified patent and that said Letters Patent is hereby corrected as shown below:

ON THE TITLE PAGE ITEM (73) ASSIGNE PLEASE ADD

SAMSUNG ELECTRONICS CO., LTD
      SUWON-SI, GYEONGGI-DO, KOREA

Signed and Sealed this

Tenth Day of October, 2006

JON W. DUDAS
*Director of the United States Patent and Trademark Office*

UNITED STATES PATENT AND TRADEMARK OFFICE
CERTIFICATE OF CORRECTION

PATENT NO. : 7,088,376 B2
APPLICATION NO. : 09/976274
DATED : August 8, 2006
INVENTOR(S) : Hyun-Soo Park Page 1 of 1

It is certified that error appears in the above-identified patent and that said Letters Patent is hereby corrected as shown below:

On title page please add
Item

(74)    Attorney, Agent, or Firm:

-- Robert E. Bushnell, Esq. --

Signed and Sealed this

Twenty-seventh Day of February, 2007

JON W. DUDAS
*Director of the United States Patent and Trademark Office*